(12) United States Patent
Hufnagel

(10) Patent No.: US 10,935,032 B2
(45) Date of Patent: Mar. 2, 2021

(54) MOUNTING SYSTEM BETWEEN A RING MEMBER AND A ROTOR

(71) Applicant: ebm-papst Mulfingen GmbH & Co. KG, Mulfingen (DE)

(72) Inventor: Volker Hufnagel, Rothenburg o.d.Tbr. (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 330 days.

(21) Appl. No.: 16/117,695

(22) Filed: Aug. 30, 2018

(65) Prior Publication Data

US 2019/0063446 A1    Feb. 28, 2019

(30) Foreign Application Priority Data

Aug. 31, 2017  (DE) ...................... 10 2017 120 088.6

(51) Int. Cl.
    *H02K 1/30*       (2006.01)
    *F04D 25/06*      (2006.01)
    (Continued)

(52) U.S. Cl.
    CPC ......... *F04D 25/064* (2013.01); *F04D 29/646* (2013.01); *H02K 1/2786* (2013.01);
    (Continued)

(58) Field of Classification Search
    CPC ........ H02K 1/2786; H02K 1/278; H02K 1/28; H02K 21/222; H02K 1/30
    See application file for complete search history.

(56) References Cited

U.S. PATENT DOCUMENTS

| 4,850,100 A * | 7/1989 | Stokes | H02K 1/278 |
| | | | 29/596 |
| 7,709,987 B2 * | 5/2010 | Watanabe | H02K 1/2786 |
| | | | 310/156.21 |

(Continued)

FOREIGN PATENT DOCUMENTS

| DE | 70 15 880 U | 8/1970 |
| DE | 199 51 594 A1 | 5/2001 |

(Continued)

OTHER PUBLICATIONS

German Search Report, Application No. 10 2017 120 088.6, dated May 22, 2018, 1 pg.

(Continued)

*Primary Examiner* — Dang D Le
(74) *Attorney, Agent, or Firm* — Dickinson Wright PLLC

(57) ABSTRACT

The present disclosure relates to a mounting system between two mounting elements which are designed as ring member and rotor of an electric motor, wherein, on one of the mounting elements, at least one catching hook is formed, and, on the other mounting element, at least one catching groove is formed, which, in the fastened state, engage in a positive-lock manner and directly in one another in a fastening manner and connect the ring member and the rotor releasably to one another. On one of the mounting elements, at least one resilient spring element is formed, which, in the fastened state of the ring member on the rotor, exerts a biasing force on the other mounting element which is directed opposite a holding force of the at least one catching hook.

10 Claims, 1 Drawing Sheet

(51) Int. Cl.
  *H02K 15/14* (2006.01)
  *H02K 1/27* (2006.01)
  *H02K 5/22* (2006.01)
  *H02K 7/14* (2006.01)
  *F04D 29/64* (2006.01)
  *H02K 1/28* (2006.01)
  *F04D 19/00* (2006.01)
  *F04D 29/32* (2006.01)
  *H02K 5/15* (2006.01)

(52) U.S. Cl.
  CPC ............... *H02K 5/22* (2013.01); *H02K 7/14* (2013.01); *H02K 15/14* (2013.01); *F04D 19/002* (2013.01); *F04D 29/329* (2013.01); *H02K 1/28* (2013.01); *H02K 5/15* (2013.01)

(56) References Cited

U.S. PATENT DOCUMENTS

2008/0197737 A1  8/2008  Poulin et al.
2017/0130724 A1  5/2017  Bielesch et al.

FOREIGN PATENT DOCUMENTS

| DE | 10 2012 205 690 A1 | 10/2013 |
| DE | 10 2013 226662 A1 | 6/2015 |
| DE | 20 2016 102 350 U1 | 6/2016 |
| DE | 10 2015 210 641 A1 | 12/2016 |
| DE | 10 2015 222 005 A1 | 5/2017 |
| DE | 10 2015 222005 A1 | 5/2017 |
| JP | S63 65896 U | 4/1988 |

OTHER PUBLICATIONS

International Search Report for European Application No. 18191537.2, dated Jan. 4, 2019, 9 pgs.

* cited by examiner

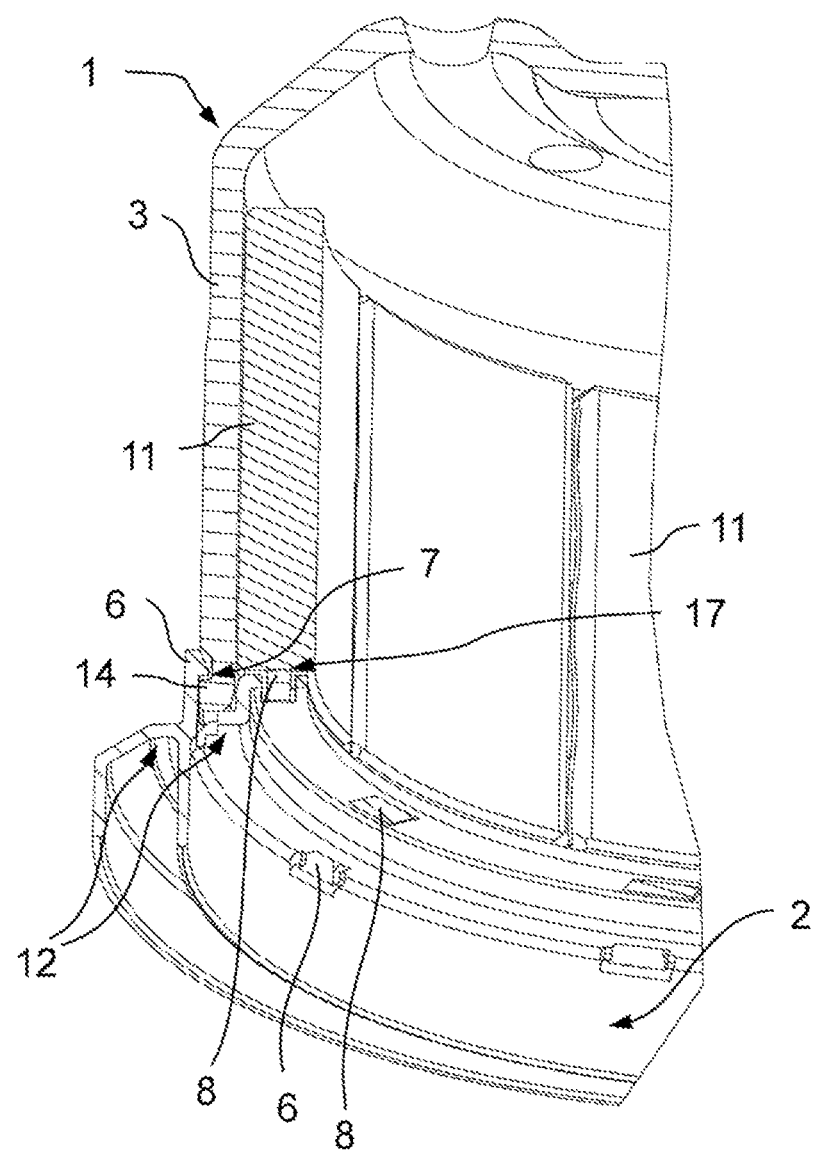

MOUNTING SYSTEM BETWEEN A RING MEMBER AND A ROTOR

RELATED APPLICATIONS

This application claims priority to German Patent Application No. 10 2017 120 088.6, filed on Aug. 31, 2017.

FIELD

The present disclosure relates to a releasable mounting system between two mounting elements designed as ring member and rotor of an electric motor.

BACKGROUND

Known from the prior art is a connection between the rotor of the electric motor and the ring member axially mounted thereon, which is used, for example, for the connection of a fan, by means of a screw connection or gluing. Here, a flange is usually provided which bridges the rotor and the ring member and connects the two components. In the case of firmly bonded connections, it is disadvantageous that they are not releasable. In the case of screw connections, the installation effort is relatively high. In addition, the use of an additional connection flange is disadvantageous due to the resulting high number of parts.

BRIEF SUMMARY

The present disclosure provides a mounting between a ring member and a rotor of an electric motor which is releasable and easier to install and uninstall, and which manages with fewer parts.

Proposed according to the present disclosure is a mounting system between two mounting elements which are designed as ring member and rotor of an electric motor, wherein, on one of the mounting elements at least one catching hook is formed, and, on the other mounting element at least one catching groove is formed, which, in the fastened state, engage in a positive-lock manner and directly in one another in a fastening manner and connect the ring member and the rotor releasably to one another. On one of the mounting elements, at least one resilient spring element is formed, which in the fastened state of the ring member on the rotor, exerts a biasing force on the other mounting element, which is directed opposite a holding force of the at least one catching hook.

Due to the connection of the two mounting elements, ring member and rotor, directly engaging in one another, additional elements are obsolete. However, at the same time, via the spring element, a biasing force between the ring member and the rotor is generated, which counteracts the positive-lock engagement by the catching hooks and catching grooves and therefore ensures a lasting reliable connection, without the mounting elements being able to move with respect to one another. At the same time, the connection can be released, in that the catching hooks are pushed out of the catching grooves. Due to the biasing force, the mounting elements are then pushed apart in axial direction and released from one another.

In an advantageous embodiment variant of the mounting system, it is provided that the at least one catching hook and the spring element are designed to form a single piece on the ring member. This reduces the number of components. For example, the at least one catching hook and the spring element can be formed by a plastic component by primary shaping, in particular by injection molding, to form a single piece.

Moreover, an advantageous design is one in which the at least one catching hook is designed to be resiliently mobile in radial direction so that it can engage in the at least one catching groove in order to produce the mounting, and so that it can disengage from the at least one catching groove in order to release the mounting. The connection can then be produced and released multiple times. The resilience can be ensured, for example, by an appropriate material selection, in particular a plastic selection.

In order to ensure an optimal interaction without tilting or the like between the ring member and the rotor, it is provided in an embodiment example that the at least one catching hook, the at least one catching groove, and the at least one spring element, when viewed in the peripheral direction, are arranged within the same arc angle around rotation axis of the rotor, so that they overlap one another when viewed in radial direction, i.e., they are arranged in one and the same radial plane.

Furthermore, an advantageous variant of the mounting system is one in which, in the fastened state of the ring member on a rotor, a contact shoulder of the at least one catching groove for the engagement for the at least one catching hook lies in the same axial plane as a contact surface on which the spring element exerts the biasing force. The forces of the catching hook and of the spring element which act oppositely in axial direction thus act one after the other, wherein, when the mounting elements are axially moved on one another, the biasing force increases until the catching hooks engage in the catching grooves.

Furthermore, in an embodiment the mounting system is characterized in that at least one resilient spring element is arranged radially inlying opposite with respect to the at least one catching hook and acts on the contact surface which is designed as an axial end surface of one of the mounting elements. Here, it can be provided advantageously that the contact surface has a recess in which the spring element engages. The recess and the spring element can in addition have a corresponding shape. Thus, in addition to providing the biasing force in axial direction, the spring element also provides a holding force in radial direction.

To the extent that, in the mounting system, when viewed in the peripheral direction, several catching hooks and several catching grooves are provided, they are arranged preferably in each case oppositely with respect to a central rotation axis of the rotor. In addition, an angular separation in peripheral direction is preferably in each case identical. For example, if in each case three catching hooks and three catching grooves are used, they would therefore be arranged preferably at 120° arc angle apart from one another.

A development of the mounting system provides that an axial surface of the respective mounting element which forms the ring groove, said axial surface extending in axial direction and adjoining the at least one catching groove, has a bevel. Along the bevel, the at least one catching hook for the mounting of the mounting elements can slide onto the at least one ring groove and in the process undergo a biasing in radial direction until the catching hook snaps into the catching groove. In addition, such a bevel facilitates the installation.

Furthermore, an advantageous design is one in which the at least one ring groove is formed on an outer peripheral surface of the rotor, so that the catching hooks of the ring member engage on the outside in the rotor.

An embodiment example of the mounting element is furthermore characterized in that the catching hook extends as a peripheral ring around the ring member and the catching groove extends as a peripheral ring groove around the rotor. The connection region between the ring member and the rotor is thus peripherally protected by the catching hook formed as a peripheral ring. In addition, the installation is simplified, since there is no need for associating certain catching hooks with certain catching grooves.

As a concrete embodiment variant, a mounting system is moreover proposed, in which the ring member is designed as a labyrinth ring with several step sections adjoining one another in radial direction. Here, as a variant, it can be provided moreover that the rotor has an axial projection section which, in the fastened state of the ring member on the rotor, is in contact in a positive-lock manner with at least one of the step sections of the ring member both in axial and also in radial direction. Thereby, the ring member and the rotor can be positioned precisely with respect to one another.

Other advantageous developments of the present disclosure are characterized in the dependent claims or are represented in further detail below together with the description of the preferred embodiment of the present disclosure in reference to the FIGURE. In the FIGURE:

BRIEF DESCRIPTION OF THE DRAWINGS

FIG. 1 shows a partial section view of a rotor with ring member.

DETAILED DESCRIPTION

In FIG. 1, an inventive embodiment example of a rotor 1 of an electric motor with ring member 2 mounted thereon is shown in a partial section, wherein the ring member 2 is designed as a labyrinth ring with several step sections 12 adjoining one another in radial direction. The rotor 1 comprises a rotor housing 3 and a plurality of magnets 11 which are mounted in peripheral direction adjacently to one another on the inner wall surface of the rotor housing 3.

The rotor 1 and the ring member 2 designed as labyrinth ring are connected to one another by the mounting system. In the depicted design, the mounting system comprises a plurality of catching hooks 6 designed to form a single piece on the ring member 2 and which are distributed in peripheral direction, and a corresponding plurality of catching grooves 7 formed in the outer peripheral surface of the rotor housing 3, catching grooves in which the catching hooks 6 engage, so that a positive locking and releasable connection is formed between the rotor housing 3 and the ring member 2 with direct engagement in one another. In addition, on the ring member, a plurality of resilient spring elements 8, designed as arms protruding axially with respect to the rotor 1, are provided which, in the depicted mounted state of the ring member 2 on the rotor 1, exert an axial biasing force on the rotor 1. The biasing force of the spring elements 8 acts against the axial holding force by the catching hooks 6, so that the catching hooks 6 are pushed against the respective contact shoulder of the catching grooves 7.

The ring member 2 is preferably produced from an at least partially resilient plastic, thus ensuring that the catching hooks 6 are also mobile resiliently in radial direction, so that they can engage in the catching grooves 7. By a radially outward movement, the catching hooks 6 can also be released again. The spring elements 6 then push the ring member 2 in axial direction away from the rotor 1, and the two mounting elements can be separated from one another.

As shown in FIG. 1, the respective axial contact shoulders of the catching grooves 7, on which the holding force of the respective catching hooks 6 acts, lie substantially in the same axial plane as the contact surface on which the spring elements 8 exert the biasing force on the respective magnets 11 of the rotor 1. In the contact surface, the magnets 11 in each case comprise a recess 17 in which the respective spring element 8 completely engages.

The catching hooks 6, the catching grooves 7, the spring elements 8, and the recesses 17, when viewed in peripheral direction, are arranged within the same arc angle around the central rotation axis, so that they overlap one another when viewed in radial direction, i.e., they lie in the same radial plane.

The step sections 12 of the ring member 2 have axial and radial contact surfaces. The projection section 14 of the rotor housing 3 is in contact in a positive-lock manner with two of these contact surfaces and it is overlapped radially on the outside by the catching hook 6. This clamping limits two degrees of freedom and a corresponding axial and radial relative movement of the rotor 2 with respect to the ring member 2.

The embodiment example shown does not cover all the disclosed features that can be provided additionally or as substitutes. For example, as a variant, on the catching grooves 7, in the region of the projection section 14, a bevel can be provided, along which the catching hooks 6 slide along widening radially outward until they engage in the respective ring groove 7. Also not shown, but possibly usable as an alternative, is a design wherein catching hooks 6 are designed as a peripheral ring around the ring member 2 and the catching hook 6 is designed as a peripheral ring groove.

The invention claimed is:

1. A mounting system having two mounting elements which are designed as ring member and rotor of an electric motor, wherein, on one of the mounting elements at least one catching hook is formed, and, on the other mounting element at least one catching groove is formed, which, in a fastened state engage in a positive-lock manner and directly in one another in a fastening manner to connect the ring member and the rotor releasably to one another, wherein, on the ring member, the at least one catching hook, and at least one resilient spring element are formed, which, in the fastened state of the ring member on the rotor, exerts a biasing force on an axial end surface of a contact surface of the other mounting element that is directed opposite a holding force of the at least one catching hook, wherein the ring member is formed as a labyrinth ring with several step sections adjoining one another in radial direction, wherein the rotor comprises an axial projection section which, in the fastened state of the ring member on the rotor, is in contact with at least one of the step sections of the ring member both in axial and radial direction, wherein the at least one catching groove is formed on an outer peripheral surface of the rotor or of a rotor housing of the rotor, wherein the axial projection section, in the fastened state of ring member and the rotor, contacts at least one of the step sections of the ring member in a positive-lock manner, and wherein, in the fastened state of the ring member and the rotor, a contact shoulder of the at least one catching groove for the engagement for the at least one catching hook lies in the same axial plane as the contact surface on which the spring element exerts the biasing force.

2. The mounting system according to claim 1, wherein the at least one catching hook and the at least one spring element are designed to form a single piece on the ring member.

3. The mounting system according to claim 1, wherein the at least one catching hook is designed to be resiliently mobile in radial direction, such that it can engage in the at least one catching groove and produce the mounting, and such that it can disengage from the at least one catching groove in order to release the mounting.

4. The mounting system according to claim 1, wherein the at least one catching hook, the at least one catching groove, and the at least one spring element, when viewed in peripheral direction, are arranged within a common arc angle around a central rotation axis of the rotor.

5. The mounting system according to claim 1, wherein the at least one resilient spring element is arranged radially inlying opposite with respect to the at least one catching hook and acts on the contact surface which is designed as an axial end surface of one of the mounting elements.

6. The mounting system according to claim 1, wherein the contact surface comprises a recess in which the spring element engages.

7. The mounting system according to claim 1, wherein, when viewed in peripheral direction, several catching hooks and several catching grooves are provided, which are arranged in each case oppositely with respect to a central rotation axis of the rotor.

8. The mounting system according to claim 1, wherein an axial surface of the respective mounting element forming the at least one catching groove comprises a bevel, said axial surface adjoining the at least one catching groove and extending in axial direction.

9. The mounting system according to claim 1, wherein the at least one catching hook extends as a peripheral ring around the ring member, and the catching groove extends as a peripheral ring groove around the rotor.

10. The mounting system according to claim 1, wherein the rotor comprises a plurality of magnets on its inner wall surface, and the spring element exerts the biasing force against a magnet.

* * * * *